Nov. 6, 1962    D. R. HAWKINSON ETAL    3,062,589
FEEDING POWDER AT UNIFORM RATES

Filed Dec. 14, 1959    2 Sheets-Sheet 1

INVENTORS
DONALD R. HAWKINSON
DAVID B. TODD
BY *Oswald N Milmore*
THEIR ATTORNEY Nov. 6, 1962　　　D. R. HAWKINSON ETAL　　　3,062,589
FEEDING POWDER AT UNIFORM RATES
Filed Dec. 14, 1959　　　　　　　　　　　　2 Sheets-Sheet 2

INVENTORS
DONALD R. HAWKINSON
DAVID B. TODD
BY *Oswald H. Wilmore*
THEIR ATTORNEY 3,062,589
FEEDING POWDER AT UNIFORM RATES
Donald R. Hawkinson, Kensington, and David B. Todd, Oakland, Calif., assignors to Shell Oil Company, New York, N.Y., a corporation of Delaware
Filed Dec. 14, 1959, Ser. No. 859,370
10 Claims. (Cl. 302—56)

The invention relates to feeding pulverulent material at a substantially constant rate and is, more particularly, concerned with an improved method and apparatus wherein the powder is fed together with gas from a fluidized bed through a flow-restrictive device under hydrostatic pressure of the bed.

There are numerous industrial uses for streams of powder which flow at substantially constant flow rates. One example is the mixing of solid filler with liquid resin prior to curing, wherein it is important that the solids, which occur as pulverulent particles with diameter of 30 to 1,000 microns, be supplied at rates having a fixed ratio to the resin flow rate. Mechanical feeders, such as those using screw conveyors, maintain average flow rates with acceptable accuracy; however, they often deliver powder at instantaneous flow rates which deviate significantly, e.g., 5 to 20%, or more from the average, especially with certain types of solids described herein called "non-free-flowing."

Attempts to reduce the variations in the powder flow rates by fluidizing the powder with fluidizing gas within a fluidiziation chamber and discharging the powder through an orifice under the hydrostatic pressure of the bed were unsuccessful with non-free-flowing solid particles. It was found that such solid particles do not form a homogeneous fluidized bed, due to their non-free-flowing nature; instead, it was observed in experiments conducted in transparent chambers that the air channels upwards through the bed and that slug flow of air occurs, leading to large variations in the hydrostatic pressure and, hence, in the rate at which the powder is discharged through the orifice. Moreover, sporadic plugging of the orifice often occurs.

By "non-free-flowing solids" is meant solids such as asbestos and titanium dioxide, which differ from particles such as fine sand and alumina in that they have non-uniform bulk densities or tend to agglomerate or have irregular shapes such that the mass has a varying angle of repose. In fact, with such solids the angle of repose characterization is often meaningless in that angles in excess of 90° can occur.

It is an object of the invention to provide an improved process and apparatus for reducing the variations in the flow rate of pulverulent solids, especially those which are not free-flowing, from a fluidized bed.

In summary, according to the invention the pulverulent solids are charged continually, preferably continuously but not necessarily uniformly at the desired average flow rate, into a fluidizing chamber wherein the solids are fluidized by gas; the solids, together with a part of the gas, are discharged through a solids outlet which has a flow-restrictive device such as an orifice plate from a level beneath the top of the fluidized bed, under the hydrostatic pressure of the latter; and uniformity in the rate of flow of the solids through the flow-restrictive device is improved by mechanically homogenizing the fluidized bed and thereby minimizing or substantially preventing fluctuation in the hydrostatic pressure at the flow-restrictive device.

Not all forms of mechanical agitation were found to be effective to homogenize a fluidized bed of non-free-flowing powder. Thus, simply shaking the fluidizing chamber laterally, or spinning a single rotor with paddles within the bed did not homogenize the bed, but instead concentrated solids in certain regions of the chamber and led to erratic flow of gas and solids. Such motions, further, do not alleviate sporadic orifice plugging. Vertical oscillations of low frequencies, viz., from 10 to 400 cycles per minute, preferably from about 30 to 300 cycles, resulted in effective homogenizing of the bed and in maintaining the orifice clear. However, other mechanical motions which do not concentrate the solids in regions of pockets are also effective; these have not been preferred because they involve the use of special and usually complex stirring devices to avoid the concentrating tendency but are nevertheless included within the invention in its broader scope.

The fluidization chamber will normally be provided with separate outlet means for a part of the fluidizing gas from the upper part of the chamber.

Separation of the gas from the powder after passage through the flow-restrictive device is necessary only in certain applications, e.g., when the powder alone is to be fed into a fluid stream. In such case a continuous separator of any known or suitable type, e.g., a cyclone or a simple gravity pot may be used, depending upon the fineness of the powder. It is evident that in other instances no such separation is required, as when the powder is desired in the form of a suspension in the gas, e.g., for gas transporting to remote location where metered quantities of the solids are required.

The invention will be further described with reference to the accompanying drawings forming a part of this specification and showing one preferred embodiment, wherein.

Figure 1:
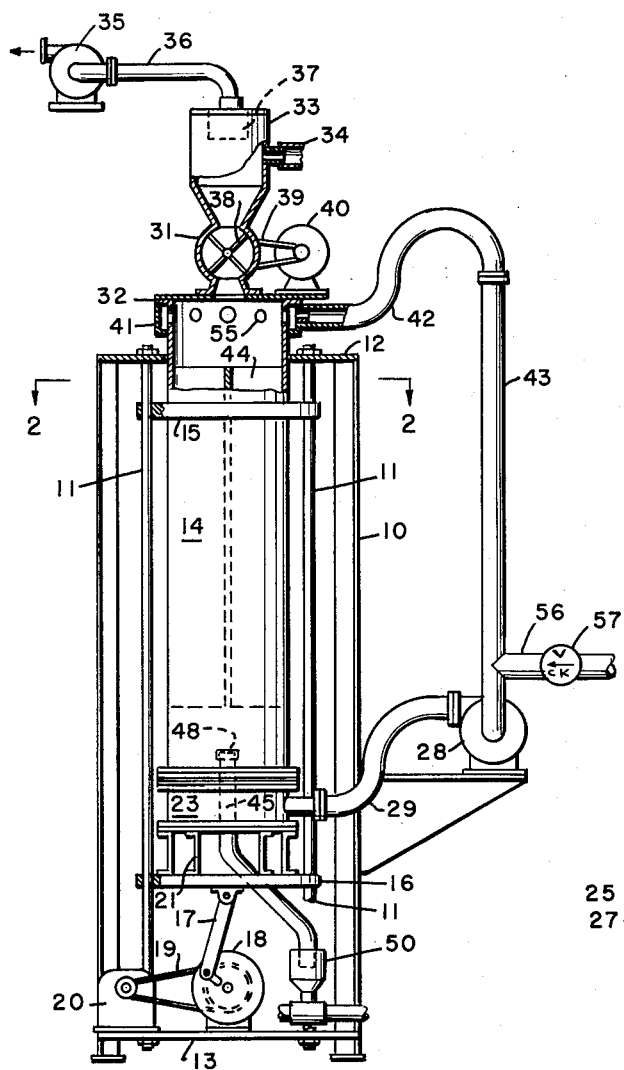
FIG. 1 is an elevation view of the feeder, parts being shown in section.
Figure 2:
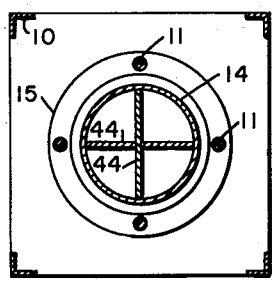
FIG. 2 is a transverse section taken on the line 2—2 of FIG. 1.
Figure 5:
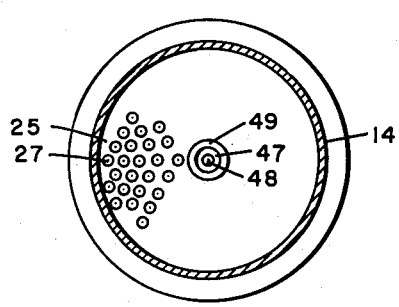
FIG. 5 is a transverse sectional view taken on the line 5—5 of FIG. 3 but reduced in scale.
Figures 3, 4:
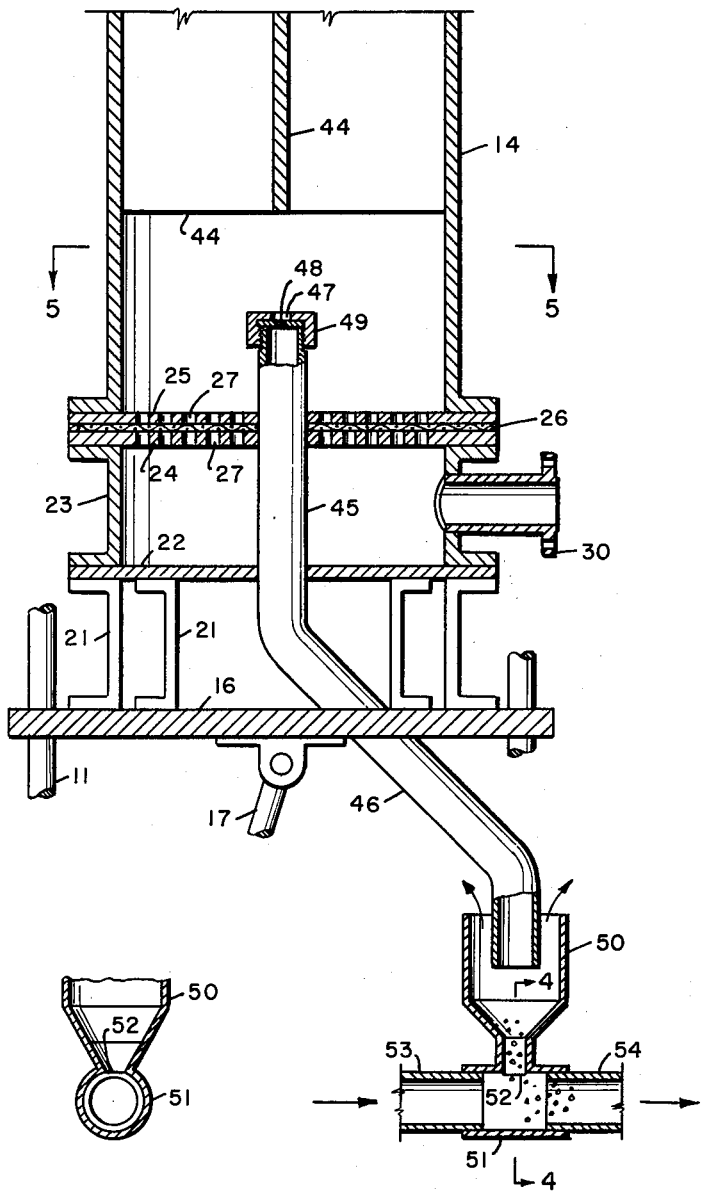
FIG. 3 is a vertical sectional view, on an enlarged scale through the lower part of the fluidization chamber and a mixing unit for feeding the solids to a fluid stream.
FIG. 4 is a sectional view taken on the line 4—4 of FIG. 3.

Referring to the drawings, the apparatus comprises an upright frame 10 which carries stationary vertical guide rods 11 secured to cross members 12 and 13 at the top and bottom. The fluidization chamber 14 may be in the form of a circular cylinder; it is mounted for vertical reciprocation by means of an upper support plate 15 fixed to the outside of the cylinder and a lower support plate 16. These plates have holes through which the guide rods 11 extend slidingly. The plate 16 receives vertical support from a crank 17 having a radially adjustable eccentric pivotal connection on a crank wheel 18, which is journalled on the frame and driven by a belt 19 from an electric motor 20. The chamber 14 is supported vertically on the plate 16 by rigid uprights 21, a bottom plate 22, an annular housing wall 23, and a foraminous air distributor constructed, in this embodiment, by a pair of transverse plates 24 and 25 separated by a screen 26. The plates 24 and 25 have numerous small holes 27 distributed over their areas. The several parts are suitably united by bolting flanges, as shown.

The plate 22 and wall 23 define a gas-inlet chamber to which fluidizing gas is admitted under pressure from any suitable source, schematically represented by an air blower 28 and a flexible hose 29 which is coupled to a bolting flange 30. The fluidizing gas ascends through the openings 27 and is distributed over the area of the chamber. The screen 26 has a dual purpose: It insures distribution of gas by presenting some resistance to gas flow, thereby functioning as a diffuser; and it prevents entry of powder from the fluidization chamber into the gas-inlet chamber, being preferably made of fine mesh.

The apparatus includes a device for charging powder into the fluidization chamber. While a specific type of charging device, which reciprocates with the chamber will be described for purposes of making a complete disclosure, it will be understood that the invention is not restricted thereto. As shown, the top of the chamber is closed by the base of a star feeder 31 which is bolted to the flange 32 and includes a feed hopper 33 to which powder is supplied from a source, not shown, via a flexible hose 34. Entry of powder into the hopper is conveniently facilitated by applying suction to the hopper from a blower 35 via a flexible hose 36, which is connected to the hopper through a bag filter 37. The star feeder includes a vaned rotor 38 which is driven at a controlled speed by a belt 39 from a variable-speed electric motor 40. It is evident that the average rate at which powder is supplied to the chamber 14 can be nicely controlled by varying the speed of this rotor. When the top of the chamber is thus closed it is desirable to provide ports 55 near the top for the escape of fluidizing gas. These should be large enough to permit efflux of gas at a sufficiently low velocity to avoid or minimize the entrainment of powder. When extremely fine powder is dealt with any suitable or conventional means, such as a cyclone or bag filter, may be provided to separate powder from the gas before discharge; moreover, these ports may discharge into a collecting manifold 41 which is connected by a flexible hose 42 and pipe 43 to the intake side of the blower 28 to supply a part of the fluidization gas by recirculation, the rest of the air being admitted via a branch inlet 56 and check valve 57.

The chamber may optionally be provided with vertical, radially disposed partition walls 44 which divide the upper part thereof into a plurality of laterally isolated compartments, each having a reduced horizontal area. Their purpose will be described hereinafter. The several compartments are in free intercommunication at the top and bottom.

The fluidization chamber is fitted with an axial outlet tube 45 which is fixed in and extends through the plates 16, 22, 24 and 25 and may have an inclined section 46 to clear the rod 17. It is fitted at the top with a flow-restrictive device, such as an orifice plate 47 having an orifice 48 and retained by a cap 49. The plate 47 is mounted at or near the bottom of the chamber. Although in the illustrated embodiment this orifice plate is fixed to the chamber and reciprocates vertically therewith, this is not essential. The lower end of the outlet tube extends into a stationary hopper 50 with ample radial clearance so as to provide a large, annular, low-velocity path for the escape of fluidizing gas. It was found that in many applications this arrangement is adequate to separate gas from powder carried by the outlet tube; it is, however, to be understood that more elaborate means for recovering solids may be employed when necessary. These being well known per se, they are not described herein.

The hopper 50 may be used to feed the powder to a fluid stream. For example, it can be connected to conduit section 51 having a lateral opening 52 and coupled to upstream and downstream pipes 53 and 54 through which the fluid is passed for continuously admixing the powder to the fluid.

In operation, the motor 20 is operated to oscillate the chamber 14 vertically along the guides 11 by means of the crank 17 at a desired frequency, e.g., from 10 to 400 cycles per minute. Pulverulent material from the hopper 33 is charged into the chamber 14 at the desired average rate by driving the rotor 38 of the star feeder at the required speed. Fluidizing gas is admitted by the blower 28 to the inlet chamber within the wall 23 and enters the bottom of the chamber 14 to fluidize the powder. The resulting fluidized bed exerts a hydrostatic head at the level of the orifice plate 47 and solids, together with a part of the fluidizing gas, flow through the orifice 48 into the outlet tube 45 at a rate which is determined in part by the pressure drop across the orifice and the size of the orifice and further by the character of the gas and the solids. The pressure drop may be varied by changing the bed height (e.g., by changing the vessel size or rate of charge of solids); and the orifice size may be varied by replacing the plate 47 with one having an orifice of the required size. After passage through the orifice the gas is separated from the solids within the hopper 50 and the solids enter the conduit section 51 through the opening 52 by gravity to enter the fluid stream flowing through the conduit, e.g., a liquid resin.

By oscillating the chamber 14 vertically the fluidized bed is also oscillated. This homogenizes the bed and overcomes the tendency of non-free-flowing solids to agglomerate or to be distributed unevenly in the bed. This tendency, if not overcome, creates fluctuations in the hydrostatic pressure and, hence, in the rate at which solids are discharged through the orifice. The stroke of the crank 17 can be adjusted by radially changing its point of attachment to the wheel 18. Typically, amplitudes of one-tenth to four inches are used but the invention is not limited to these values.

When large chambers, e.g., over three inches in diameter are used, the above-described oscillations cause the fluidized solids to be sloshed laterally, leading occasionally to a non-level bed surface. This phenomenon, and its adverse effect on the constancy of the hydrostatic pressure, are minimized by the partitions 44, which restrict such unevenness in bed height to smaller zones.

*Example*

A fluidization chamber constructed as shown (except that the manifold 41 and recycle ducts 42 and 43 were omitted) had a height of 24 inches and an internal diameter of 4 inches. Finely divided asbestos with particle diameters less than one-tenth of an inch was charged at the top by the star feeder at an average rate of 0.74 lb. per minute and fluidizing air was admitted at the bottom at the rate of approximately 1 standard cu. ft. per minute. The instantaneous rate at which solids were charged by the star feeder varied ±20% of the average rate. About 98% of the fluidizing air escaped through the outlet ports 55 and the remainder, together with the solids, was drawn off through the orifice, which has a diameter of 3/16 inch.

In this example when the chamber 14 was stationary the fluidized bed was not uniform in that severe channeling developed and the rate of flow of solids through the orifice consistently dropped to zero within 10 to 30 seconds after the bed became stationary. Stirring the fluidized bed and vibrating the chamber laterally failed to homogenize the bed or clear the orifice.

When the chamber was reciprocated vertically with a stroke of 2 inches at a frequency of 240 cycles per minute, the fluidized bed was homogenized and the instantaneous rate of solids flow was within ±1.8% of the average.

We claim as our invention:

1. Process of feeding powder at a uniform rate which comprises the steps of: charging said powder continually to a fluidization zone; fluidizing said powder within said zone by admitting fluidizing gas into a lower part of the zone and discharging a part of the admitted gas at an upper part thereof and thereby forming a fluidized bed; homogenizing said fluidized bed by imparting vertical oscillatory movement thereto and discharging said powder together with another part of the admitted gas from the fluidized bed from a level beneath the top thereof through a flow-restrictive device under the hydrostatic pressure of said bed at a substantially constant rate.

2. Process according to claim 1 wherein the upper part of said fluidizing bed, above the level of discharge of powder, is maintained as a plurality of laterally isolated zones each having a smaller horizontal area than the total bed area at the said discharge level.

3. Process according to claim 1 wherein the frequency of said oscillatory movement is between 10 and 400 cycles per minute.

4. Process of feeding powder of the type which is non-free-flowing at a uniform rate which comprises the steps of: charging said powder continuously at a controlled average rate into a fluidization zone; fluidizing said powder within said zone by admitting fluidizing gas into a lower part of the zone and discharging a part of the admitted gas at an upper part thereof; homogenizing the fluidized bed by imparting vertical oscillatory motion thereto discharging said powder together with another part of the admitted gas from the fluidized bed from a level beneath the top thereof through a flow-restrictive device under the hydrostatic pressure of said bed at a substantially constant rate; and continuously separating the gas from the discharged powder after passage through said flow-restrictive device.

5. Apparatus for feeding powder at a uniform rate which comprises: a confined fluidization chamber; means for charging powder continually to said chamber; means for admitting a fluidizing gas to a lower part of the chamber to form a fluidized bed of said powder; means for discharging fluidizing gas from an upper part of the chamber; means for mechanically homogenizing said fluidized bed including a vertically reciprocable member in contact with said fluidized bed over a horizontally extended area and means for imparting vertical oscillations to said member; and an outlet including a flow-restrictive device immersed in said fluidized bed at a level beneath the top thereof for the passage of powder and gas from said bed under hydrostatic pressure of the bed at a substantially constant rate.

6. Apparatus according to claim 5 wherein at least the bottom of said chamber is vertically reciprocable and constitutes the said member.

7. In combination with the apparatus according to claim 5, vertical partition means within said chamber situated above the level of the said flow-restrictive device for dividing the chamber into laterally isolated zones each of lesser horizontal area than the lower area of the chamber.

8. In combination with the apparatus according to claim 5, a gas-powder separator connected to receive the powder and gas discharged from the chamber; conduit means adapted for the flow of liquid therethrough, said conduit means having a lateral opening, and means for admitting solids from said separator through said lateral opening into said conduit means for continuous admixture to said liquid.

9. Apparatus according to claim 5 wherein said flow-restrictive device is mounted for vertical reciprocation by said means for imparting vertical oscillations.

10. Apparatus for feeding powder which comprises: a vertically elongated, confined fluidization chamber; means for charging powder continuously at a substantially constant average rate to said chamber; means for admitting a fluidizing gas to a lower part of the chamber at a steady rate to form a fluidized bed of said powder; means for discharging fluidizing gas from an upper part of the chamber; an outlet having a flow-restrictive device situated at a level below the top of the bed for the passage of powder and gas from said bed under hydrostatic pressure of the bed; means for imparting vertical oscillatory motion to said fluidized bed and to said flow-restrictive device to cause the passage of powder through said device at a rate which is more uniform than the said charging rate; and means for continuously separating the gas from the powder after passage through said flow-restrictive device.

References Cited in the file of this patent

UNITED STATES PATENTS

| 1,616,008 | Stout | Feb. 1, 1927 |
|---|---|---|
| 1,616,547 | Pontoppidan | Feb. 8, 1927 |
| 2,637,625 | Garbo | May 5, 1953 |
| 2,676,142 | Crowley | Apr. 20, 1954 |
| 2,817,561 | Planiol | Dec. 24, 1957 |